United States Patent
Ferguson et al.

(10) Patent No.: US 10,160,315 B2
(45) Date of Patent: Dec. 25, 2018

(54) TWO WHEEL DRIVE LOW RANGE DEVICES AND SYSTEMS

(71) Applicant: 2LOW INC., Lombardy, Ontario (CA)

(72) Inventors: John D. Ferguson, Lombardy (CA); Anthony A. Ferguson, Lombardy (CA)

(73) Assignee: 2LOW INC., Ontario (CA)

( * ) Notice: Subject to any disclaimer, the term of this patent is extended or adjusted under 35 U.S.C. 154(b) by 91 days.

(21) Appl. No.: 15/404,453

(22) Filed: Jan. 12, 2017

(65) Prior Publication Data

US 2017/0197505 A1 Jul. 13, 2017

(30) Foreign Application Priority Data

Jan. 12, 2016 (CA) ..................................... 2917373

(51) Int. Cl.
*B60K 23/08* (2006.01)
*B60R 16/023* (2006.01)
*B60K 17/346* (2006.01)

(52) U.S. Cl.
CPC .......... *B60K 23/08* (2013.01); *B60K 17/3467* (2013.01); *B60R 16/0231* (2013.01); *B60K 2023/085* (2013.01); *B60Y 2300/28* (2013.01); *B60Y 2400/40* (2013.01)

(58) Field of Classification Search
None
See application file for complete search history.

(56) References Cited

U.S. PATENT DOCUMENTS

| | | | | |
|---|---|---|---|---|
| 6,000,488 A | * | 12/1999 | Atkinson | B60K 17/342 180/197 |
| 9,758,038 B2 | * | 9/2017 | Ogawa | B60K 23/08 |
| 2009/0057047 A1 | * | 3/2009 | Beechie | B60K 23/08 180/233 |
| 2014/0297150 A1 | * | 10/2014 | Ohyagi | B60K 17/3505 701/89 |
| 2015/0159708 A1 | * | 6/2015 | Ajimoto | B60K 23/0808 701/68 |
| 2017/0008396 A1 | * | 1/2017 | Takaishi | F16D 13/74 |
| 2017/0166052 A1 | * | 6/2017 | Ogawa | B60K 23/08 |

* cited by examiner

*Primary Examiner* — Justin Holmes
(74) *Attorney, Agent, or Firm* — Stetina Brunda Garred and Brucker

(57) ABSTRACT

Removable devices and systems for operating the four wheel drive (4WD) system of a tow vehicle having an electronically controllable part time 4WD system including a selectable 4WD low range mode are described. The removable device may comprise a first interface for coupling the removable device to a selector, the selector providing an indication of a desired operating mode for the 4WD system; a second interface for coupling the removable device to a controller-area network bus of the tow vehicle; a memory storing vehicle control codes; and at least one controller communicatively coupled to both the first interface and the second interface. The removable device, and system, may allow a vehicle operator to operate the tow vehicle in two-wheel drive low range mode.

14 Claims, 10 Drawing Sheets

TWO WHEEL DRIVE LOW RANGE DEVICES AND SYSTEMS

CROSS-REFERENCE TO RELATED APPLICATIONS

This application claims priority to Canadian Patent Application No. 2,917,373 filed Jan. 12, 2016, which is incorporated herein by reference in its entirety.

STATEMENT RE: FEDERALLY SPONSORED RESEARCH/DEVELOPMENT

Not Applicable

BACKGROUND

The present invention relates generally to devices and systems for operating a four wheel drive system of a vehicle. More specifically, the present invention relates to devices and systems for switching a four wheel drive vehicle into two-wheel drive low range.

Tow vehicles, such as 4WD trucks, are often tasked with towing heavy loads over terrain which can be difficult to navigate. While towing a heavy load, tow vehicles may be operated in four wheel drive (4WD) using low range gearing, commonly referred to as a low range mode.

Low range mode provides a lower gear ratio, making it easier for the tow vehicle to move heavy loads; however, maneuverability in the low range mode may be negatively affected. Making low-speed tight turns under high-traction conditions may be difficult and may result in undesirable consequences such as wheel hop or axle windup, which can be uncomfortable to an operator and potentially damaging to the tow vehicle and/or the load being towed.

Previous attempts at addressing the difficulties with low range modes of operation have included complex modifications to vacuum lines used in controlling a front axle disconnect allowing a tow vehicle to operate in a low-gear range while only driving two of the four tires.

An alternative, additional, and/or improved device or system for operating a 4WD system of a tow vehicle is desirable.

BRIEF SUMMARY

In accordance with the present disclosure there is provided an attachable device for operating a four wheel drive (4WD) system of a tow vehicle having an electronically controllable part time four wheel drive system including a selectable 4WD low range mode, the attachable device comprising: a first interface for coupling the attachable device to a selector, the selector providing an indication of a desired operating mode for the 4WD system; a second interface for coupling the attachable device to a controller-area network bus of the tow vehicle; a memory storing vehicle control codes associated with disengaging front wheels of the tow vehicle from the transfer case when the tow vehicle is in the 4WD low range mode, thereby placing the tow vehicle into a two-wheel drive low range mode of operation; at least one controller communicatively coupled to both the first interface and the second interface, the controller programmed for: determining whether to disconnect the front wheels while the tow vehicle is operating in the 4WD low range mode based on the indication of the desired operating mode determined from the selector received over the first interface; and transmitting the vehicle control codes associated with disconnecting the front wheels of the tow vehicle to the control-area network bus over the second interface.

In a further embodiment of the attachable device the second interface comprises a connector for connecting to an onboard diagnostic port of the tow-vehicle.

In a further embodiment of the attachable device wherein the connector for connecting to the onboard diagnostic port of the tow-vehicle is connected to the second interface through a cable.

In a further embodiment of the attachable device the connector for connecting to the onboard diagnostic port of the tow-vehicle is removably connected to the second interface.

In a further embodiment of the attachable device the first interface comprises a wired connection to the selector.

In a further embodiment of the attachable device the wired connection is removably connected to the first interface.

In a further embodiment of the attachable device the selector comprises a physical switch remotely located from the attachable device.

In a further embodiment of the attachable device wherein the first interface comprises a wireless connection to the selector.

In a further embodiment of the attachable device the indication of the desired operating mode for the 4WD system comprises one of:

an indication of an operating mode for operating in a 2 wheel drive low range mode; and an indication of an operating mode for not operating in the 2 wheel drive low range mode.

In a further embodiment of the attachable device determining whether to disconnect the front axle disconnect while the tow vehicle is operating in the 4WD low range mode based on the indication of the desired operating mode determined from the selector received over the first interface comprises: determining that the desired operating mode is a two wheel drive low range mode; determining if the tow vehicle is operating in the 4WD low range mode using commands sent over the second interface; and sending the vehicle control codes associated with disengaging front wheels of the tow vehicle from the transfer case when the tow vehicle is determined to be operating in the 4WD low range mode and the desired operating mode is the two wheel drive low range mode.

In a further embodiment of the attachable device determining whether to disconnect the front axle disconnect while the tow vehicle is operating in the 4WD low range mode based on the indication of the desired operating mode determined from the selector received over the first interface further comprises: determining a current speed of the tow vehicle using commands sent over the second interface; and sending the vehicle control codes associated with disengaging front wheels of the tow vehicle from the transfer case when the tow vehicle is determined to be operating in the 4WD low range mode, the desired operating mode is the two wheel drive low range mode, and the current speed of the tow vehicle is below a switching threshold.

In a further embodiment of the attachable device the memory stores a plurality of vehicle control codes each associated with a different make, model and/or year of tow vehicle.

In a further embodiment of the attachable device the vehicle control codes associated with disengaging front wheels of the tow vehicle from the transfer case when the tow vehicle is in the 4WD low range mode comprise a sequence of one or more individual vehicle control codes.

In accordance with the present disclosure there is provided a system for operating a 4wd system of a tow vehicle having an electronically controllable part time four wheel drive system including a selectable 4WD low range mode, the system device comprising: an attachable device comprising: a first interface for coupling the attachable device to a selector, the selector providing an indication of a desired operating mode for the 4WD system of the tow vehicle; a second interface for coupling the attachable device to a controller-area network bus of the tow vehicle; and at least one controller communicatively coupled to both the first interface and the second interface, the controller programmed for: transmitting a vehicle control codes associated with disconnecting the front axle disconnect of the tow vehicle to the control-area network bus over the second interface; and a remote selector comprising: a third interface for coupling the remote selector to the first interface of the attachable device; a memory storing vehicle control codes associated with disengaging front wheels of the tow vehicle from the transfer case when the tow vehicle is in the 4WD low range mode, thereby placing the tow vehicle into a two-wheel drive low range mode of operation; at least one additional controller communicatively coupled to the third interface, the at least one additional controller programmed for: determining whether to disconnect the front axle while the tow vehicle is operating in the 4WD low range mode based on the indication of the desired operating mode determined from the selector received over the first interface; and transmitting the vehicle control codes associated with disconnecting the front axle of the tow vehicle to the attachable device over the third interface.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Tow vehicles having an electronically controllable part time four wheel drive (4WD) system often include a selectable 4WD low range mode. The electronically controllable 4WD system allows an operator of the vehicle to select a mode of operation of the vehicle, including a high range 2×4 mode, a high range 4×4 mode and a low range 4×4 mode. An attachable device is described further herein that allows an operator of the tow vehicle to operate the tow vehicle in a low range 2×4 mode. In contrast to previous systems that allowed an operator to switch to a low range two wheel drive (2WD) mode but required significant modification to the physical systems of the tow vehicle including modifying vacuum lines used to disconnect the front wheels from the transfer case, the current attachable device is easily attachable to the tow vehicle and provides electronic control of the disconnection of the front axle while in low range to provide a 2WD low range mode. The attachable device requires minimal, if any, modifications to be made during installation. The attachable devices and systems for selectively controlling operation of a tow vehicle to provide electronic control of a 2WD low range mode are described further herein. It will be appreciated that embodiments and examples of such attachable devices and systems are provided herein for illustrative purposes intended for those skilled in the art, and are not meant to be limiting in any way.

Figure 1:
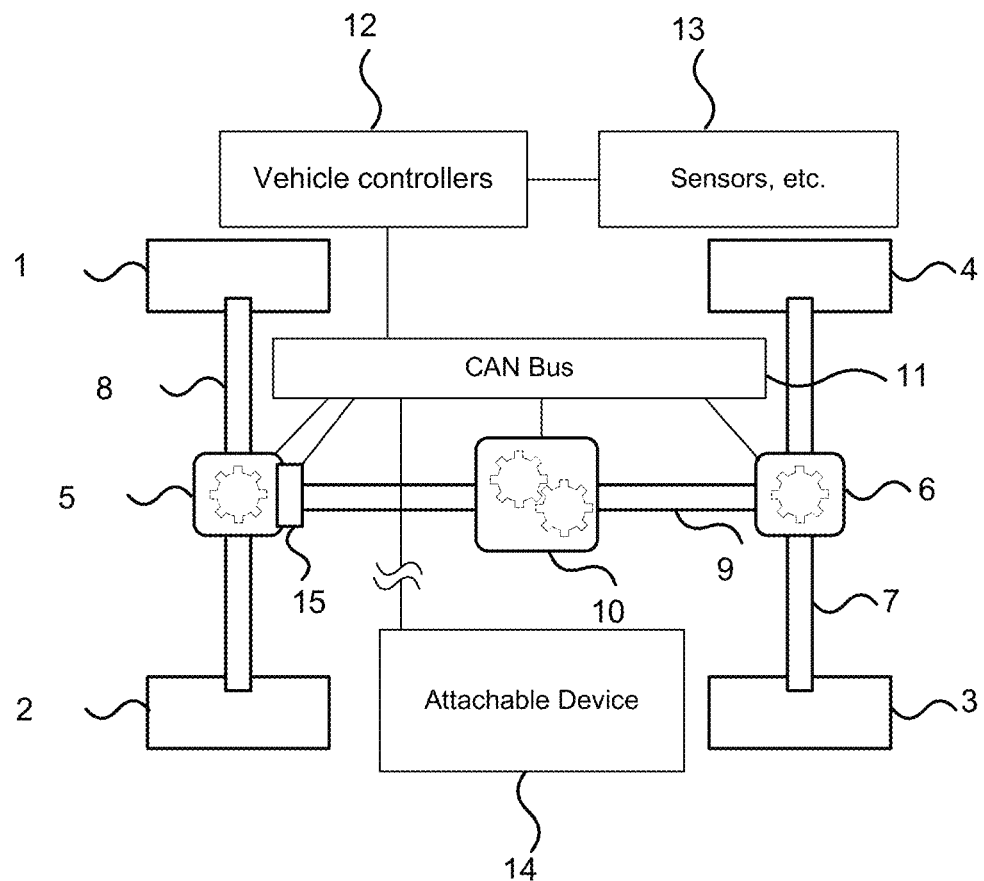
FIG. 1 shows schematically an embodiment of an attachable device for operating a 4WD system of a tow vehicle wherein an attachable device is installed in the tow vehicle having an electronically controllable part time 4WD system including a selectable 4WD low range mode.

FIG. 1 depicts a schematic view of components of a tow vehicle, including an attachable device for selectively controlling a 2WD low range mode. The attachable device provides electronic control to selectively provide a 2WD drive low range mode. The tow vehicle in which the attachable device may be used has an electronically controllable part time 4WD system including a selectable 4WD low range mode. The tow vehicle comprises front wheels (1) and (2) linked through a front axle (8) and having an associated front differential (5). The tow vehicle also includes rear wheels (3) and (4) linked through axle (7) and having an associated rear differential (6). The front differential (5) and rear differential (6) are each powered by a drive shaft shown as (9); it will be understood that the drive shaft (9) may be provided as two separate drive shafts, one for the front differential (5) and one for the rear differential (6). The front axle disconnect control (15) can be electronically controlled in order to disconnect the front wheels (1,2) from the engine. The front and rear drive shafts (9) are each coupled to an engine (not depicted) through a transfer case (10). The transfer case (10) provides gearing, including the high and low range gearing, for providing power to the front and rear hub differentials through the front and rear drive shafts.

The front axle disconnect control (15) is depicted as a single component that disengages or engages the front differential to disconnect the front wheels from the engine. However, it will be appreciated that the front axle disconnect control (15) can be realized in various ways. For example, a solenoid may be used to disengage the front axles from the differential to disengage the front wheels. Alternatively, the hubs of the front wheels may be disconnected from the front axle.

The tow vehicle further comprises a CAN (Controller Area Network) bus (11) that provides a communication bus between connected components. The CAN bus (11) may be connected to a number of different vehicle nodes or modules. The CAN bus (11) is depicted as being communicatively coupled to the 4WD system or 4WD system components including solenoids, motors, sensors and a front axle disconnect (15). The CAN bus (11) may also be connected to other vehicle components (13) such as sensors, actuators infotainment components etc. Although depicted as a single component, a vehicle controllers (12) may be provided by multiple separate computing devices. The vehicle controller (12) controls operation of the vehicle components. The vehicle controller (12) controls operation of the drivetrain modes including whether or not the transfer case (10) is in the high range mode or the low range mode as well as whether or not the front axle disconnect is engaged to provide 4WD, or disengaged to provide 2WD. The vehicle controller (12) controls operation of the components by sending, and possibly receiving, data over the CAN bus or directly to the desired components (11). As described further below, an attachable device is provided that connects to the CAN bus (11) and allows the front wheels to be disengaged while the vehicle is in a 4WD low range mode in order to provide a 2WD low range mode. The 2WD low range mode provides greater maneuverability than the 4WD low range mode while still providing the desirable gearing ratio required to tow the heavy load.

The tow vehicle depicted in FIG. 1 is a 4WD tow vehicle having an electronically controllable part time 4WD system including a selectable 4WD low range mode. When a vehicle operator is, or will be, towing a heavy load, the operator may place the tow vehicle in a 4WD low range mode. If the operator desires to operate the vehicle in 2WD low range mode, for example in order to provide greater maneuverability while maintaining the tow capacity provided by the low gearing, the operator may activate a switch, or other similar electronic control, in communication with the attachable device can be used to disconnect the front wheels and place the tow vehicle in 2WD low range mode. The low range mode provides a lower gear ratio, making it easier for the tow vehicle to move the heavy load, while the 2WD provides greater maneuverability. It will be understood that tow vehicles may be equipped with 4WD through various mechanisms and drivetrains, one of which is depicted in FIG. 1 for illustrative purposes. It will also be understood that tow vehicles may be equipped with vehicle communication networks other than a CAN bus as depicted in FIG. 1. The person of skill in the art will understand that other 4WD drivetrains may be possible, and that other vehicle communication networks may be possible, and can adapt the devices and systems described herein accordingly.

Figure 2:
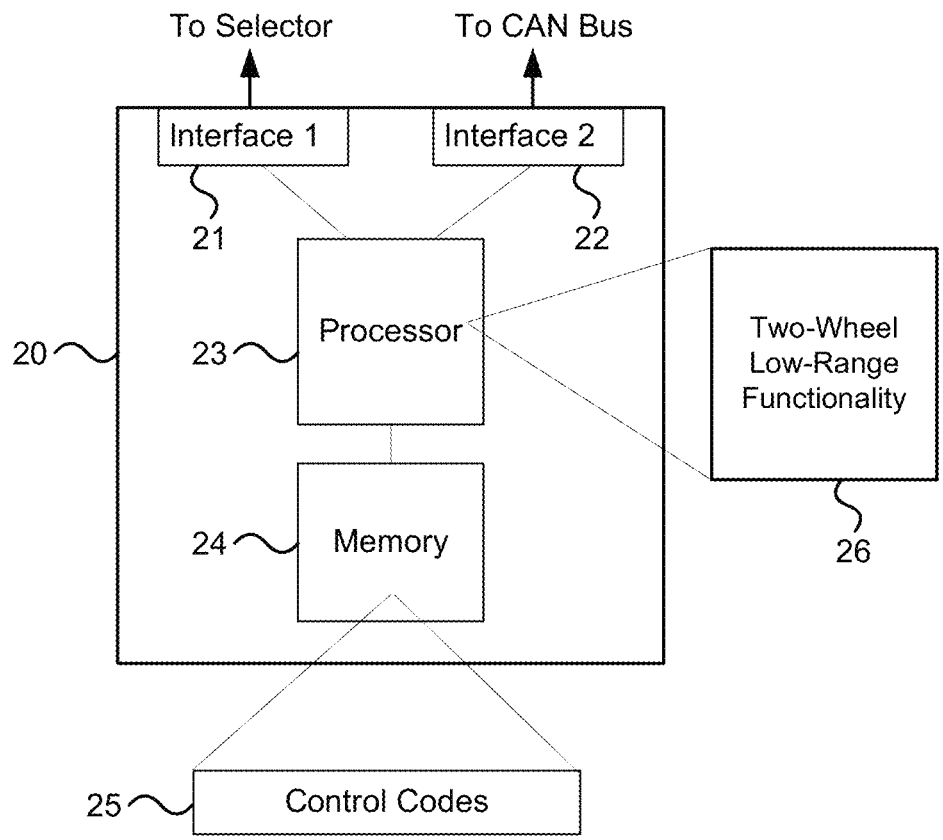
FIG. 2 depicts components of an attachable device for operating a front axle disconnect of a 4WD system as shown in FIG. 1.

FIG. 2 depicts components of an attachable device. The attachable device (20) may be used as the attachable device (14) of FIG. 1. The attachable device (20) comprises a first interface (21) for coupling the attachable device to a selector, such as a switch. The selector or switch may be located within the attachable device. The selector provides an indication of the desired operating mode of the vehicle, in particular, the selector may provide an indication of the operator's desire to operate the tow vehicle in a 2WD low range mode. The attachable device (20) further comprises a second interface (22) for coupling the attachable device to the vehicle CAN bus. The attachable device comprises a controller (23) that is configured to provide 2WD low range functionality (26) that places the tow vehicle into 2WD low range mode when in the 4WD low range mode 2WD under the control of the selector. The controller may be provided by as an application specific integrated circuit (ASIC), a field programmable gate array (FPGA), general purpose processor, microprocessor or controller which may be configured to provide the 2WD low range functionality (26) according to programming instructions stored in a memory (24). The onboard memory (24) also stores vehicle control codes (25) associated with disengaging front wheels of the tow vehicle from the transfer case when the tow vehicle is in 4WD low range mode, thereby placing the tow vehicle into a 2WD low range mode. The controller (23) may receive an indication to place the vehicle in two wheel low range mode from the selector connected to the first interface (21) and send the control codes (25) to the CAN bus over the second interface (22).

Microcontroller (23) of the attachable device (20) is communicatively coupled to the first interface (21) and the second interface (22), and is programmed for determining whether to disconnect the front wheels while the tow vehicle is operating in 4WD low range mode based on the indication of the desired operating mode determined from the selector coupled to the first interface (21) and transmitting the vehicle control codes (25) associated with disconnecting the front wheels of the tow vehicle to the CAN bus over the second interface (22).

The selector, which can be in wired or wireless communication with the attachable device through the first interface, may be any suitable selector which allows a vehicle operator to make an indication to the attachable device that 2WD low range mode is, or is not, desired. By way of example, a selector may be a physical switch located remotely from the attachable device and connected by a suitable cable. A suitable selector may comprise, for example, a button, switch, touch screen interface, knob, lever, a physical switch, or any other suitable selector. The selector may include a light or illuminator that allows the selector to be seen under low light conditions. The selector may include a light or other indicator which alerts the vehicle operator as to whether 2WD low range mode is, or is not, engaged. For example, the selector may include a red LED that glows when 2WD low range mode is activated, and a white LED that glows when 2WD low range mode is not activated. The selector may be installable within the cabin of the tow vehicle in a location which is accessible to the operator of the vehicle. The selector may provide the attachable device, via the first interface, with an indication of a desired operating mode for the 4WD system. The indication may comprise one of an indication of an operating mode for operating in a 2WD low range mode and an indication of an operating mode for not operating in the 2WD low range mode.

The controller (23) of the attachable device may be programmed for determining whether to engage or disengage the front axle disconnect in order to disconnect the front wheels while the tow vehicle is operating in the 4WD low range mode based on the indication of the desired operating mode determined from the selector coupled to the first interface. This determination may comprise, for example, determining that the desired operating mode is a 2WD low range mode and sending appropriate commands, such as the control codes (25) when it is determined that the desired operating mode is the 2WD low range mode. The control determination may further include determining if the tow vehicle is operating in the 4WD low range mode using commands and data sent and received over the second interface, and sending the vehicle control codes (25) associated with disengaging front wheels of the tow vehicle from the transfer case when the tow vehicle is determined to be operating in the 4WD low range mode and the desired operating mode is the 2WD low range mode.

In another embodiment, this determination may further comprise, for example, determining a current speed of the tow vehicle using commands and data sent and received over the second interface, or through other means such as an associated Global Positioning System (GPS) device, and sending the vehicle control codes associated with disengaging front wheels of the tow vehicle from the transfer case only when the current speed of the tow vehicle is below a switching threshold.

It will be understood that the attachable device may, optionally, include safety features which prevent switching the tow vehicle into 2WD low range mode in circumstances which may cause damage to the vehicle or compromise vehicle operation. For example, the attachable device may include a safety feature which prevents switching into 2WD low range mode when vehicle speeds are too high for low range.

Figure 3:
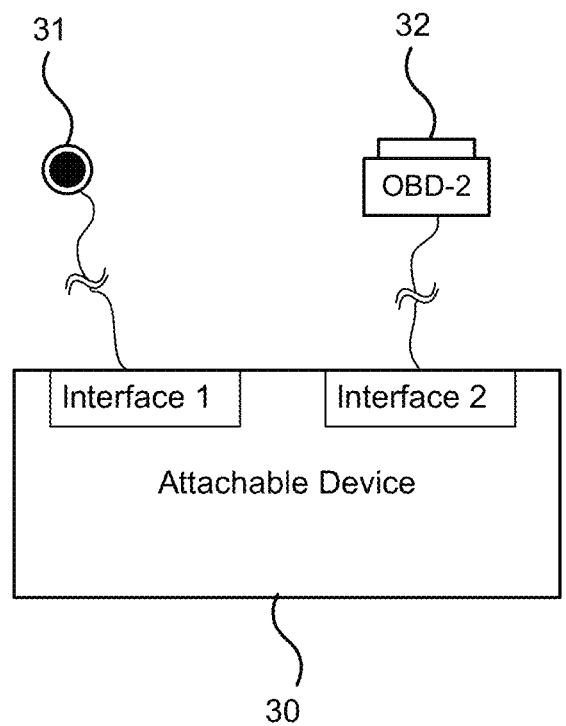
FIG. 3 depicts a further attachable device for operating a front axle disconnect.

In further embodiments, the memory of the attachable device may store vehicle-specific vehicle control codes, or a plurality of vehicle control codes where each is associated with a different make, model, and/or year of tow vehicle. The attachable device may be configured to select the appropriate control codes for the particular tow vehicle by an operator, or may be configured automatically may interrogating the vehicle controller using commands and data sent and received over the CAN bus through the second interface. The particular vehicle control codes associated with disengaging front wheels of the tow vehicle from the transfer case when the vehicle is in 4WD low range mode may comprise a sequence of one or more individual vehicle control codes. The attachable device described above provides an attachable node that can be communicatively attached to the vehicle controller through the vehicle CAN bus. The attachable device may send the control codes for disconnecting the front wheels directly to the front axle disconnect, or may send commands to the vehicle controller instructing the vehicle controller to disconnect the front wheels via the front axle disconnect. An embodiment of an attachable device such as that shown in FIGS. 1 and 2 is shown in more detail in FIG. 3. The attachable device (30) of FIG. 3 includes a selector (31) which is in physical (i.e. wired) connection with the first interface of the attachable device (30), and a CAN bus adaptor (32) which is in physical (i.e. wired) connection with the second interface of the attachable device (30). The CAN bus adaptor is for coupling to the CAN bus via an available CAN bus interface or port, which may be, for example an OBD 2 (on board diagnostic) port. The wired connections may, optionally, be removable connections.

Figure 4:
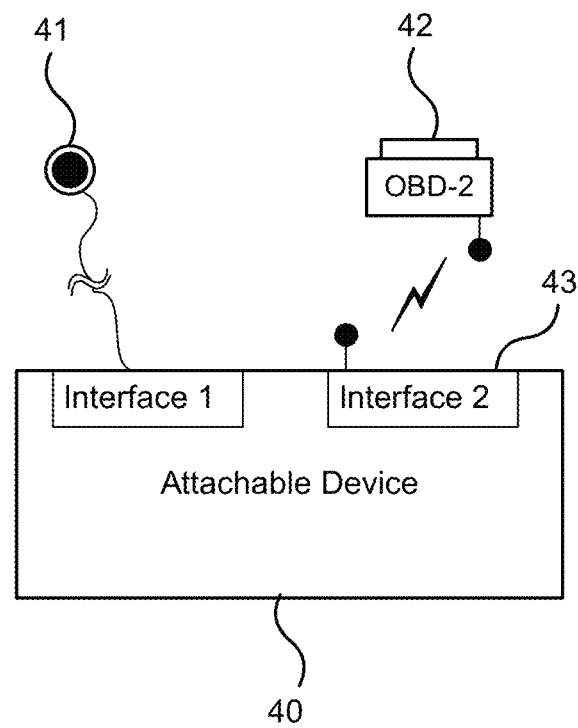
FIG. 4 depicts a further attachable device for operating a front axle disconnect.

Yet another embodiment of an attachable device such as that shown in FIGS. 1 and 2 is shown in more detail in FIG. 4. The attachable device (40) of FIG. 4 includes a selector (41) which is in physical (i.e. wired) connection with the first interface of the attachable device (40), and a CAN bus adaptor (42) which is in wireless connection with the second interface (43) of the attachable device (40). The wireless connection may be made through any suitable wireless communication protocol such as, for example, Bluetooth, ZigBee or WiFi.

Figure 5:
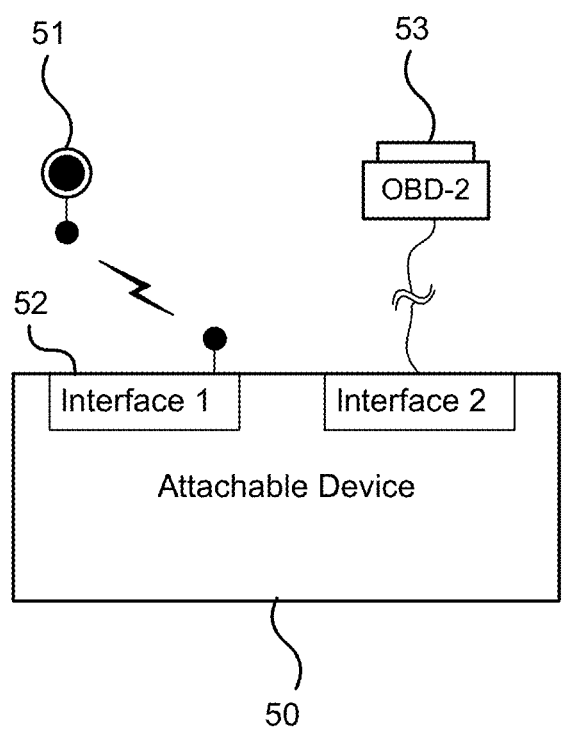
FIG. 5 depicts a further attachable device for operating a front axle disconnect.

Still another embodiment of an attachable device such as that shown in FIGS. 1 and 2 is shown in more detail in FIG. 5. The attachable device (50) of FIG. 5 includes a selector (51) which is in wireless connection with the first interface (52) of the attachable device (50), and a CAN bus adaptor (53) which is in physical (i.e. wired) connection with the second interface of the attachable device (50).

It will be appreciated that communication between the attachable device and the selector and CAN bus adaptor may be achieved through any suitable wired or wireless links known to the person of skill in the art.

In certain embodiments, the second interface of the attachable device may comprise a connector for connecting to an onboard diagnostic port of the tow vehicle, such as for example a vehicle OBD-2 interface. The connector may be connected or removably connected to the second interface, and may be in connection through, for example, a cable, although other couplings are possible.

Figure 6:
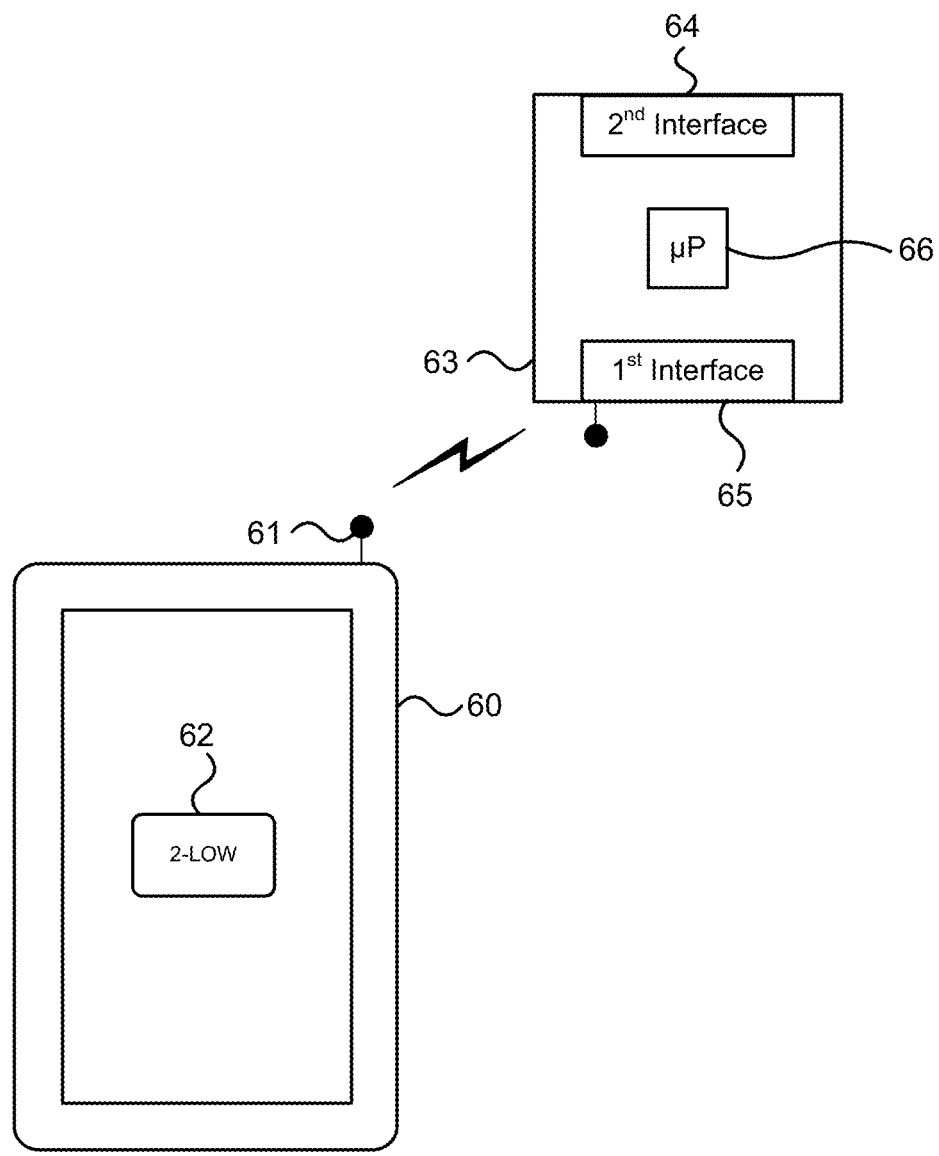
FIG. 6 depicts a system for operating a front axle disconnect.
Figure 7:
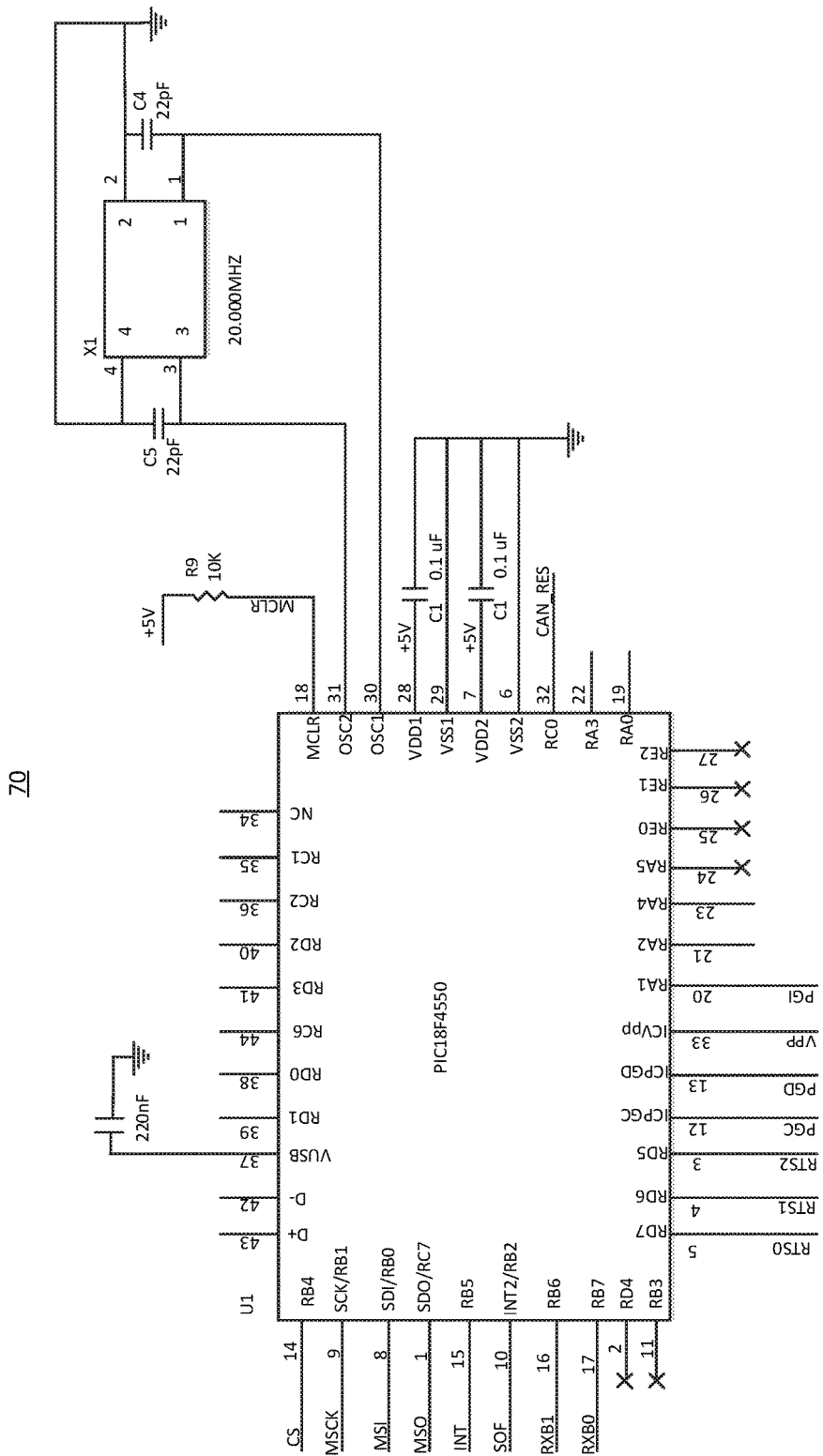
FIG. 7 shows a schematic illustration of an embodiment of a controller of an attachable device for operating a front axle disconnect of a 4WD.
Figure 8:
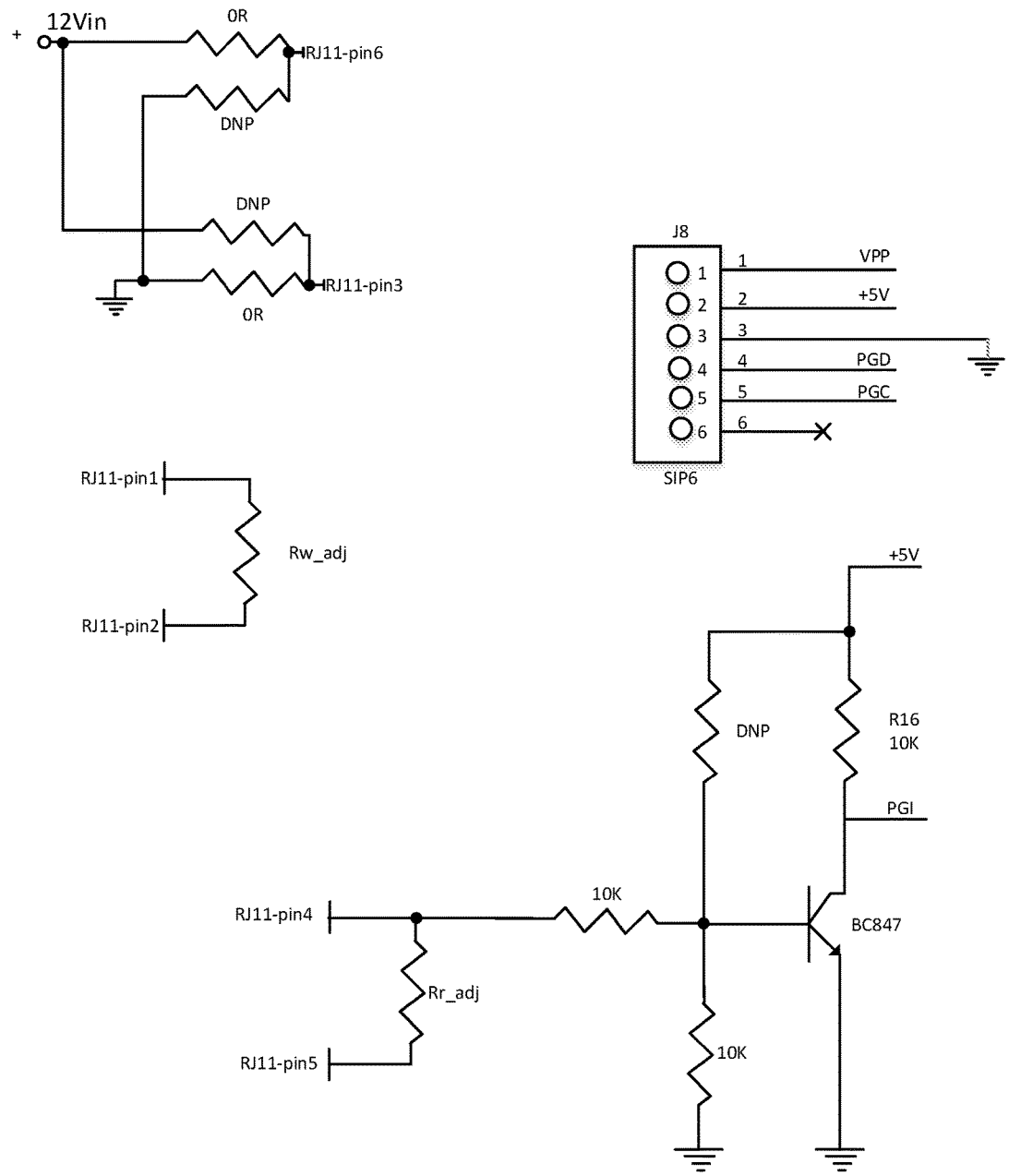
FIG. 8 shows a schematic illustration of an embodiment of a first interface for coupling of an attachable device to a selector.

FIG. 6 depicts a system in which the selector and the functionality provided by the attachable device described above are provided by a single device The illustrated system includes an attachable device (63) which comprises a first interface (65) for coupling the attachable device (63) to a selector device (60); a second interface (64) for coupling the attachable device (63) to a CAN bus of the tow vehicle, and a controller (64) coupled to the first interface (65) and second interface (64) which is programmed for transmitting vehicle control codes associated with disconnecting an axle disconnect of the tow vehicle received over the first interface (65) to the CAN bus over second interface (64). The attachable device (63) may couple or plug directly into a CAN bus port, such as the OBD-2 port via the second interface (64).

The selector device (60) is also shown in FIG. 6. The selector device (60) is depicted as a smart phone or tablet that provides a user interface providing an indication of a desired operating mode for the transfer case to the attachable device. The selector device (60) comprises a third interface (61) for coupling the remote selector (60) to the first interface (65) of the attachable device (63). The third interface (61) is shown as providing a wireless connection with first interface (65), although a wired connection is also possible. The selector device (60) further comprises a memory (not shown), storing vehicle control codes associated with disengaging front wheels of a tow vehicle from the transfer case when the tow vehicle is in 4WD low range mode, thereby placing the tow vehicle into a 2WD low range mode of operation; and a controller (not shown). The controller of the selector device (60) is programmed for determining whether to disconnect the axle disconnect while the tow vehicle is operating in the 4WD low range mode based on the indication of the desired operating mode determined from the selector received over the first interface, and transmitting the vehicle control codes associated with disconnecting the axle disconnect of the tow vehicle to the attachable device (63) over the third interface (61).

The selector device (60) shown in FIG. 6 includes a touch screen displaying a button (62) which an operator may press to activate 2WD low range mode. It will be understood that various other suitable options are available for presenting a vehicle operator with an interface for selecting to engage or disengage 2WD low range mode.

Schematics of a particular possible implementation of the attachable device and selector are depicted in FIGS. 7 to 10. It will be understood that the specific implementation described below is only one possible implementation and other implementations may be devices by one of ordinary skill in the art.

The attachable device of this example, which may be referred to as a node, comprises a controller (70) communicatively coupled to a first interface (80) and a second interface (100). The controller is programmed for determining whether to disconnect the front axle while the tow vehicle is operating in 4WD low range mode based on an indication of the desired operating mode determined from a selector (90) received over the first interface, and transmitting the vehicle control codes associated with disconnecting the front axle of the tow vehicle to the vehicle's CAN bus over the second interface.

Figure 9:
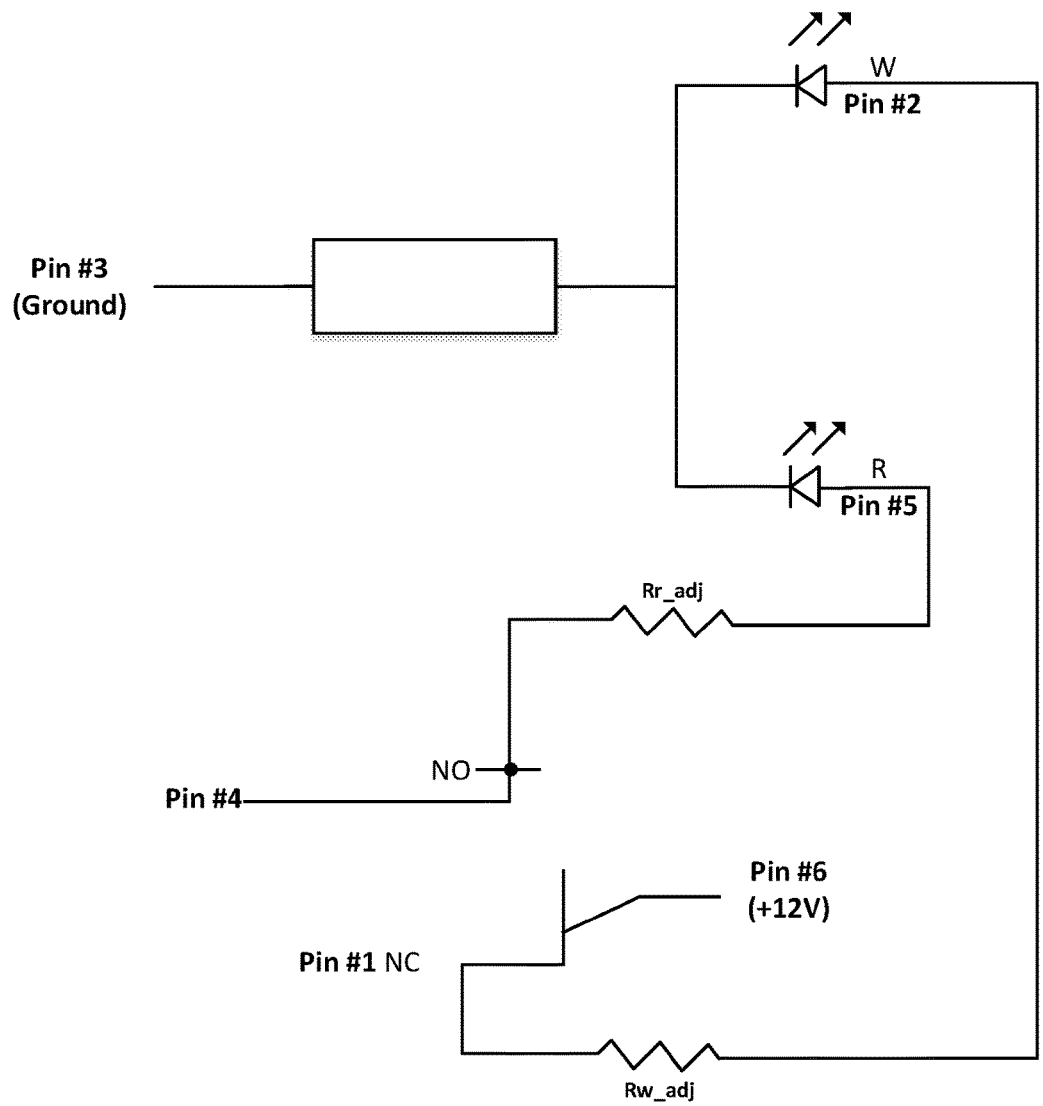
FIG. 9 shows a schematic illustration of an embodiment of a selector which can connect to a first interface such as that shown in FIG. 8.
Figure 10:
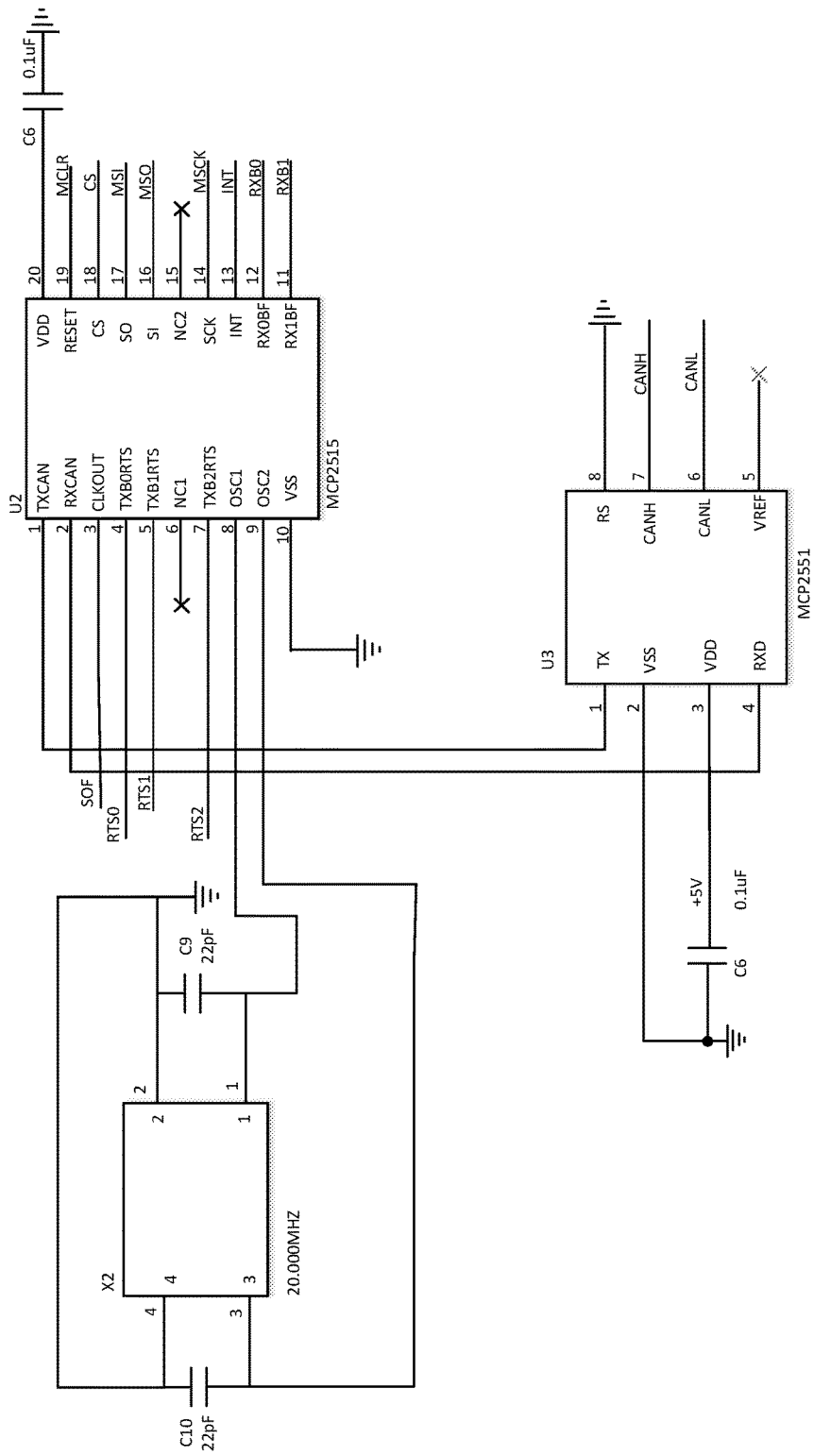
FIG. 10 shows a schematic illustration of an embodiment of a second interface for coupling of an attachable device to a CAN Bus of a tow vehicle.

The attachable device of this example further comprises a first interface (80) for coupling the attachable device to a selector, the selector providing an indication of a desired operating mode for the 4WD system. A schematic depiction of the first interface of this example is provided in FIG. 8. The first interface may further comprise a suitable power supply. In an embodiment, the first interface may comprise a RJ-11 interface, for example, or another suitable interface. A selector (90) which can be connected to the first interface of the attachable device of this example is schematically depicted in FIG. 9. In this example, the selector is a LAS1-AGQ selector.

The attachable device of this implementation further comprises a second interface (100) for coupling the attachable device to the CAN bus of the tow vehicle. A schematic depiction of the second interface of this example is provided in FIG. 10. The second interface may further comprise a suitable power supply. In an embodiment, the second interface may comprise an RJ-45 physical interface to connect to a physical connector of the CAN bus, for example, or another suitable interface.

As described above, when the attachable device sends one or more control codes over the CAN bus when it is indicated that it is desired to operate in the two-wheel low range mode. For example, when the controller determines that the switch is open, no control codes may be sent. However when the controller determines that the switch is closed, the controller may send appropriate control codes for the particular make, model, year etc. of the tow vehicle. For example, for a first vehicle type, the controller may perform the following sequence:

send(can_id=0x761, dlc=8, data=[0x02, 0x3E, 0X01, 0X55, 0X55, 0X55, 0X55, 0X55])
send(can_id=0x761, dlc=8, data=[0x02, 0x10, 0x03, 0x55, 0x55, 0x55, 0x55, 0x55], wait=1)
send(can_id=0x761, dlc=8, data=[0x03, 0x22, 0x44, 0x1E, 0X55, 0X55, 0X55, 0X55], wait=1)
send(can_id=0x761, dlc=8, data=[0x10, 0x0C, 0X2F, 0X1E, 0X75, 0X03, 0X00, 0X00], wait=1)
send(can_id=0x761, dlc=8, data=[0x21, 0x00, 0x00, 0x80, 0x00, 0x00, 0x00, 0x55], wait=1)
send(can_id=0x761, dlc=8, data=[0x30, 0x00, 0x00, 0x55, 0x55, 0x55, 0x55, 0x55], wait=1)
send continuous packet every second:
send(can_id=0x761, dlc=8, data=[0x03, 0x22, 0x40, 0xE1, 0x55, 0x55, 0x55, 0x55]

For a second vehicle type, the same overall process may be performed, however the particular sequence of control codes may vary. For example, for the second vehicle type, the controller may perform the following sequence:

send(can_id=0x7e4, dlc=2, data=[0x01, 0x3E])
send(can_id=0x7e4, dlc=3, data=[0x02, 0xAA, 0x00], wait=1)
send(can_id=0x7e4, dlc=8, data=[0x10, 0x0C, 0x2C, 0xFE, 0x31, 0x15, 0x31, 0x14], wait=1)
send(can_id=0x7e4, dlc=7, data=[0x21, 0x31, 0x40, 0x31, 0x42, 0x31, 0x12], wait=1)
send(can_id=0x7e4, dlc=8, data=[0x10, 0x10, 0x2C, 0xFD, 0x31, 0x76, 0x31, 0x33], wait=1)
send(can_id=0x7e4, dlc=8, data=[0x21, 0x19, 0x40, 0 x31, 0x77, 0x31, 0x21, 0x00], wait=1)
send(can_id=0x7e4, dlc=4, data=[0x22, 0x0D, 0x19, 0x4F,], wait=1)
send(can_id=0x7e4, dlc=8, data=[0x10, 0x10, 0x2C, 0xFC, 0x31, 0x32, 0x31, 0x22], wait=1)
send(can_id=0x7e4, dlc=8, data=[0x21, 0x31, 0x17, 0x31, 0x2D, 0x31, 0x07, 0x31], wait=1)
send(can_id=0x7e4, dlc=4, data=[0x22, 0x23, 0x31, 0x19], wait=1)
send(can_id=0x7e4, dlc=8, data=[0x10, 0x0E, 0x2C, 0xFB, 0x31, 0x2F, 0x31, 0x2B], wait=1)
send(can_id=0x7e4, dlc=8, data=[0x21, 0x31, 0x2A, 0x31, 0x1C, 0x31, 0x38, 0x31], wait=1)
send(can_id=0x7e4, dlc=2, data=[0x22, 0x1A], wait=1)
send(can_id=0x7e4, dlc=7, data=[0x06, 0xAA, 0x03, 0xFE, 0xFD, 0xFC, 0xFB], wait=1)
send(can_id=0x7e4, dlc=2, data=[0x01, 0x3E], wait=1)
send(can_id=0x7e4, dlc=2, data=[0x01, 0x3E], wait=1)
send(can_id=0x7e4, dlc=8, data=[0x07, 0xAE, 0x01, 0x80, 0x00, 0x00, 0x00, 0x00], wait=1)
send continuous packet every second:
send(can_id=0x7e4, dlc=2, data=[0x01, 0x3E], wait=1)

One or more illustrative embodiments have been described by way of example. It will be understood to persons skilled in the art that a number of variations and modifications can be made without departing from the scope of the invention as defined in the claims.

What is claimed is:

1. An attachable device for operating a four wheel drive (4WD) system of a tow vehicle having an electronically controllable part time four wheel drive system including a selectable 4WD low range mode, the attachable device comprising:
   a first interface for coupling the attachable device to a selector, the selector providing an indication of a desired operating mode for the 4WD system;
   a second interface for coupling the attachable device to a controller-area network bus of the tow vehicle;
   a memory storing vehicle control codes associated with disengaging front wheels of the tow vehicle from the transfer case when the tow vehicle is in the 4WD low range mode, thereby placing the tow vehicle into a two-wheel drive low range mode of operation;
   at least one controller communicatively coupled to both the first interface and the second interface, the controller programmed for:
      determining when to disconnect the front wheels while the tow vehicle is operating in the 4WD low range mode based on the indication of the desired operating mode determined from the selector received over the first interface; and
      transmitting the vehicle control codes associated with disconnecting the front wheels of the tow vehicle to the control-area network bus over the second interface causing the tow vehicle to operate in a two wheel drive (2WD) low range mode.

2. The attachable device of claim 1, wherein the second interface comprises a connector for connecting to an onboard diagnostic port of the tow-vehicle.

3. The attachable device of claim 2, wherein the connector for connecting to the onboard diagnostic port of the tow-vehicle is connected to the second interface through a cable.

4. The attachable device of claim 3, wherein the connector for connecting to the onboard diagnostic port of the tow-vehicle is removably connected to the second interface.

5. The attachable device of claim 1, wherein the first interface comprises a wired connection to the selector.

6. The attachable device of claim 5, wherein the wired connection is removably connected to the first interface.

7. The attachable device of claim 5, wherein the selector comprises a physical switch remotely located from the attachable device.

8. The attachable device of claim 1, wherein the first interface comprises a wireless connection to the selector.

9. The attachable device of claim 1, wherein the indication of the desired operating mode for the 4WD system comprises one of:
   an indication of an operating mode for operating in the 2WD low range mode; and
   an indication of an operating mode for not operating in the 2WD low range mode.

10. The attachable device of claim 1, wherein determining whether to disconnect the front axle disconnect while the tow vehicle is operating in the 4WD low range mode based on the indication of the desired operating mode determined from the selector received over the first interface comprises:
   determining that the desired operating mode is a 2WD low range mode;
   determining that the tow vehicle is operating in the 4WD low range mode using commands sent over the second interface; and
   sending the vehicle control codes associated with disengaging front wheels of the tow vehicle from the transfer case when the tow vehicle is determined to be operating in the 4WD low range mode and the desired operating mode is the two wheel drive low range mode.

11. The attachable device of claim 10, wherein determining whether to disconnect the front axle disconnect while the tow vehicle is operating in the 4WD low range mode based on the indication of the desired operating mode determined from the selector received over the first interface further comprises:
   determining a current speed of the tow vehicle using commands sent over the second interface; and
   sending the vehicle control codes associated with disengaging front wheels of the tow vehicle from the transfer case when the tow vehicle is determined to be operating in the 4WD low range mode, the desired operating mode is the 2WD low range mode, and the current speed of the tow vehicle is below a switching threshold.

12. The attachable device of claim 1, wherein the memory stores a plurality of vehicle control codes each associated with a different make, model or year of tow vehicle.

13. The attachable devices of claim 1, wherein the vehicle control codes associated with disengaging front wheels of the tow vehicle from the transfer case when the tow vehicle is in the 4WD low range mode comprise a sequence of one or more individual vehicle control codes.

14. A system for operating a 4wd system of a tow vehicle having an electronically controllable part time four wheel drive system including a selectable 4WD low range mode, the system device comprising:
   an attachable device comprising:
   a first interface for coupling the attachable device to a selector, the selector providing an indication of a desired operating mode for the 4WD system of the tow vehicle;
   a second interface for coupling the attachable device to a controller-area network bus of the tow vehicle; and
   at least one controller communicatively coupled to both the first interface and the second interface, the controller programmed for:
   transmitting a vehicle control codes associated with disconnecting the front axle disconnect of the tow vehicle to the control-area network bus over the second interface; and
   a remote selector comprising:
   a third interface for coupling the remote selector to the first interface of the attachable device;
   a memory storing vehicle control codes associated with disengaging front wheels of the tow vehicle from the transfer case when the tow vehicle is in the 4WD low range mode, thereby placing the tow vehicle into a two-wheel drive low range mode of operation;
   at least one additional controller communicatively coupled to the third interface, the at least one additional controller programmed for:
   determining when to disconnect the front axle while the tow vehicle is operating in the 4WD low range mode based on the indication of the desired operating mode determined from the selector received over the first interface; and
   transmitting the vehicle control codes associated with disconnecting the front axle of the tow vehicle to the attachable device over the third interface causing the tow vehicle to operate in a two wheel drive (2WD) low range mode.

* * * * *